US012689751B2

(12) United States Patent
Ma et al.

(10) Patent No.: US 12,689,751 B2
(45) Date of Patent: Jul. 21, 2026

(54) DIFFERENTIAL SIGNALING FOR VIDEO CODING FOR MACHINES

(71) Applicant: QUALCOMM Incorporated, San Diego, CA (US)

(72) Inventors: Liangping Ma, San Diego, CA (US); Imed Bouazizi, Celina, TX (US); Nikolai Konrad Leung, San Francisco, CA (US); Thomas Stockhammer, Bergen (DE)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/904,887

(22) Filed: Oct. 2, 2024

(65) Prior Publication Data

US 2025/0119560 A1     Apr. 10, 2025

Related U.S. Application Data

(60) Provisional application No. 63/587,917, filed on Oct. 4, 2023.

(51) Int. Cl.
*H04N 19/189*     (2014.01)
*H04N 19/42*     (2014.01)

(52) U.S. Cl.
CPC ........... *H04N 19/189* (2014.11); *H04N 19/42* (2014.11)

(58) Field of Classification Search
CPC ....... H04N 19/189; H04N 19/42; G06T 9/002
See application file for complete search history.

(56) References Cited

U.S. PATENT DOCUMENTS

2022/0256227 A1     8/2022   Rezazadegan Tavakoli et al.
2023/0112309 A1*    4/2023   Hannuksela ......... H04N 19/184
                                                                    375/240.29

FOREIGN PATENT DOCUMENTS

CN          112541579 B   *   8/2023   ............. G06N 3/047
WO      WO-2022221374 A1  *  10/2022   ............. G06N 3/045
WO      WO-2023014901 A1  *   2/2023   ........... A63F 13/352
(Continued)

OTHER PUBLICATIONS

3GPP: "3rd Generation Partnership Project, Technical Specification Group Services and System Aspects, Study on the Enhancement for Immersive Real-Time Communication for WebRTC (Release 18)", 3GPP TR 26.930, V18.0.0, Mar. 2024, 287 Pages.
(Continued)

*Primary Examiner* — Maria E Vazquez Colon
(74) *Attorney, Agent, or Firm* — Shumaker & Sieffert, P.A.

(57)     ABSTRACT
An example device for processing video data includes a memory configured to store video data; and a processing system implemented in circuitry, the processing system being configured to: receive data representing a plurality of neural networks associated with a video bitstream, each of the plurality of neural networks having a different type; receive data representing an update to at least one of the neural networks, the data including a type corresponding to the at least one of the neural networks and a neural network structure for the update; update the neural network according to the data representing the update to generate an updated neural network; and provide video data from the video bitstream to the updated neural network to cause the updated neural network to process the video data.

20 Claims, 4 Drawing Sheets

(56)            References Cited

FOREIGN PATENT DOCUMENTS

WO          2024214011  A1    10/2024
WO      WO-2025008694  A1  *   1/2025   ............. H04N 19/85

OTHER PUBLICATIONS

International Search Report and Written Opinion—PCT/US2024/
049843—ISA/EPO—Jan. 16, 2025.
ITU-T H.266: "Series H: Audiovisual and Multimedia Systems
Infrastructure of Audiovisual Services—Coding of Moving Video",
Versatile Video Coding, The International Telecommunication Union,
Aug. 2020, 516 pages.

* cited by examiner

DIFFERENTIAL SIGNALING FOR VIDEO CODING FOR MACHINES

This application claims the benefit of U.S. Provisional Application No. 63/587,917, filed Oct. 4, 2023, the entire contents of which are hereby incorporated by reference.

TECHNICAL FIELD

This disclosure relates to transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for performing bitrate adaptation when streaming video data over a network, such as a 5G radio access network (RAN) to a task network. The video data may be coded according to video coding for machines (VCM) techniques. The video data may be encoded and decoded using artificial intelligence/machine learning (AI/ML) techniques, such as neural networks. A video encoder may specify changes to a neural network to cause the video decoder to reconfigure the decoder-side neural network. The data may be sent in band with the video data, e.g., in high layer syntax (HLS), such as in a parameter set or in a supplemental enhancement information (SEI) message or a versatile supplemental enhancement information (VSEI) message. Alternatively, the data may be sent externally to the video coding layer, e.g., in a Real-time Transport Protocol (RTP) extension header of an RTP packet that carries video data. In this manner, the video decoder may determine how to configure a decoder-side neural network to properly decode the video data. Thus, various neural networks may be used, where each of the various neural networks may be applicable to different aspects of the video data. That is, certain neural networks may be determined to better compress certain portions (e.g., regions of interest) of the video data or compress at certain stages (e.g., temporal resampling, spatial resampling, or post filtering) of the video data than others, and thus, these techniques may reduce a bitrate of a bitstream used to carry the coded video data.

In one example, a method of processing video data includes receiving data representing a plurality of neural networks associated with a video bitstream, each of the plurality of neural networks having a different type; receiving data representing an update to at least one of the neural networks, the data including a type corresponding to the at least one of the neural networks and a neural network structure for the update; updating the neural network according to the data representing the update to generate an updated neural network; and providing video data from the video bitstream to the updated neural network to cause the updated neural network to process the video data.

In another example, a device for processing video data includes a memory configured to store video data; and a processing system implemented in circuitry, the processing system being configured to: receive data representing a plurality of neural networks associated with a video bitstream, each of the plurality of neural networks having a different type; receive data representing an update to at least one of the neural networks, the data including a type corresponding to the at least one of the neural networks and a neural network structure for the update; update the neural network according to the data representing the update to generate an updated neural network; and provide video data from the video bitstream to the updated neural network to cause the updated neural network to process the video data.

In another example, a device for processing video data includes means for receiving data representing a plurality of neural networks associated with a video bitstream, each of the plurality of neural networks having a different type; means for receiving data representing an update to at least one of the neural networks, the data including a type corresponding to the at least one of the neural networks and a neural network structure for the update; means for updating the neural network according to the data representing the update to generate an updated neural network; and means for providing video data from the video bitstream to the updated neural network to cause the updated neural network to process the video data.

In another example, a computer-readable storage medium has stored thereon instructions that, when executed, cause a processor to: receive data representing a plurality of neural networks associated with a video bitstream, each of the plurality of neural networks having a different type; receive data representing an update to at least one of the neural networks, the data including a type corresponding to the at least one of the neural networks and a neural network structure for the update; update the neural network according to the data representing the update to generate an updated neural network; and provide video data from the video bitstream to the updated neural network to cause the updated neural network to process the video data.

The details of one or more examples are set forth in the accompanying drawings and the description below. Other features, objects, and advantages will be apparent from the description and drawings, and from the claims.

DETAILED DESCRIPTION

Neural networks may be used to encode and decode media data, such as image data or video data. Various neural networks may be designed to perform encoding and decoding tasks. For example, neural networks may be designed to perform region of interest (ROI) based coding, neural network based intra frame coding, frame level spatial resampling, temporal resampling (for video data), and/or post filtering. Frame level spatial resampling may include downsampling a frame spatially to get a lower spatial resolution at the encoder side, then the decoder side may upsample the frame. Temporal resampling may include dropping a certain number of frames (e.g., drop three out of every four frames) at the encoder side, and the decoder side may then upsample the video data.

The techniques of this disclosure generally include selecting different neural networks and/or updating the neural networks during encoding and decoding. The encoder may signal data to the decoder indicating an initial set of one or more neural networks, and then subsequently send the decoder updates representing different neural networks or different configurations or values for the neural networks. For example, structures of the neural networks may be altered or dropped, different sets of networks may be used, and/or different weight or bias values may be used.

Thus, the encoder may test various neural networks and/or neural network configurations to determine a set of neural networks that result in best encoding of image or video data. The decoder may then be reconfigured to appropriately decode the resulting image or video data. In this manner, these techniques may reduce bitrate of the associated bitstream including the image or video data.

These techniques are generally based on machine learning methods, e.g., using artificial intelligence/machine learning (AI/ML), such as neural networks. These techniques may be used in conjunction with hybrid techniques, which may include both traditional engineered coding techniques and neural network based techniques.

Figure 1:
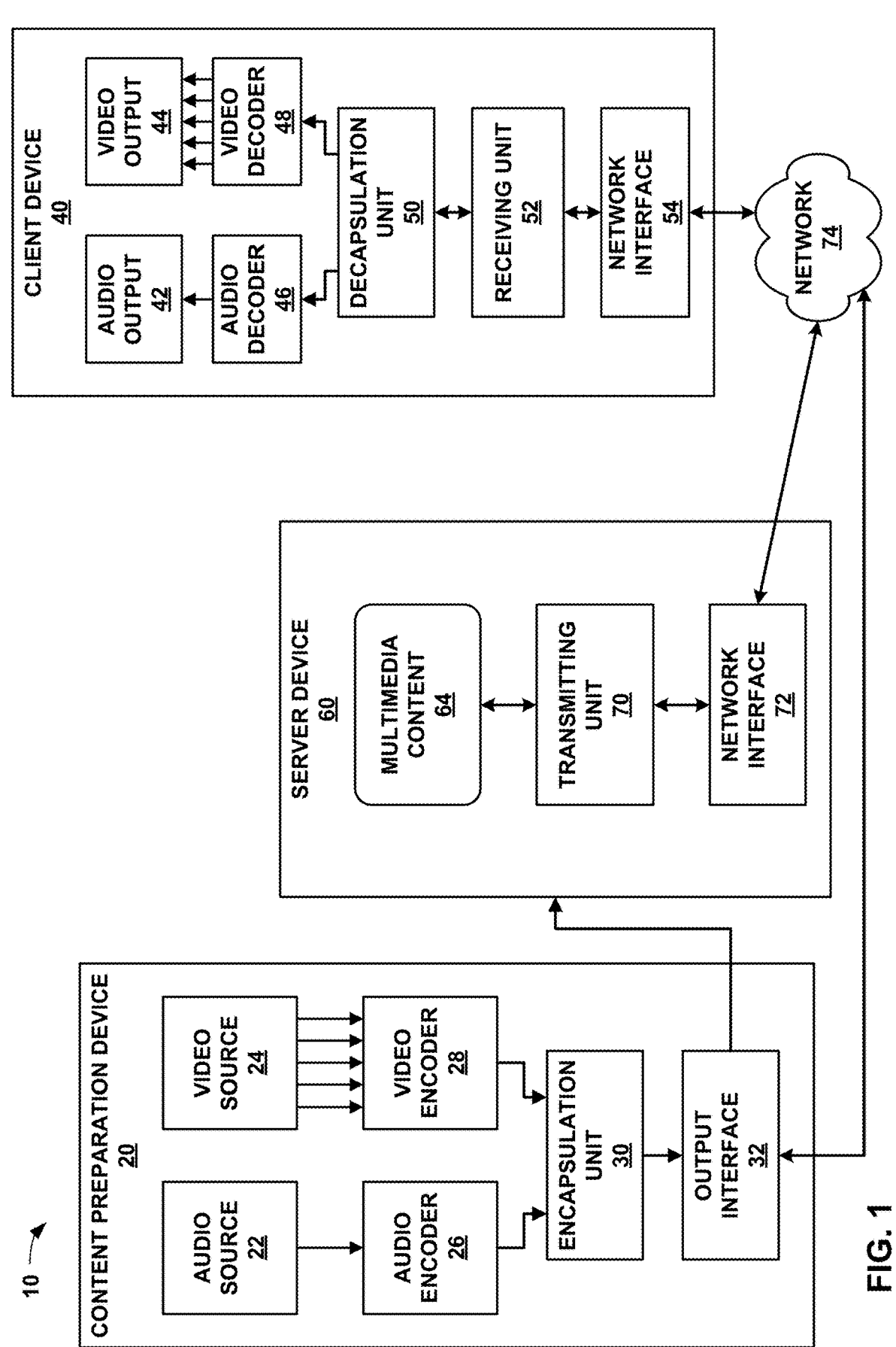
FIG. 1 is a block diagram illustrating an example system that implements techniques for streaming media data over a network.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a media presentation. For example, the coded video or audio part of the media presentation can be an elementary stream. An elementary stream may be converted into a packetized elementary stream (PES) before being encapsulated within a video file. Within the same media presentation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into streamable media data.

According to the techniques of this disclosure, video encoder 28 may include a variety of different neural networks. Additionally or alternatively, video encoder 28 may be configured to dynamically reconfigure a neural network during encoding tasks. Various neural networks may be configured to perform different encoding tasks. Thus, video encoder 28 may include a region-of-interest (ROI) based neural network encoder, an intra-prediction neural network encoder, an inter-prediction neural network encoder, a frame-level spatial resampling neural network, a temporal resampling neural network, and/or a post filtering neural network. Likewise, each neural network may include a variety of configurable parameters, such as weights and biases. In some examples, there may be alternative neural networks having different structures (e.g., configurations of neurons) or combinations/sequences of structures.

Video encoder 28 may encode data for an encoded video bitstream representing one or more neural networks to be used when decoding the encoded video bitstream. The data representing the one or more neural networks may include data representing, for each neural network, a type or purpose of the neural network (e.g., ROI based decoding, intra-prediction decoding, frame-level spatial resampling, temporal resampling, or post filtering). The data may further specify, for each neural network, one or more structures of the neural network, along with weight and bias values. The data may also specify an identifier for each neural network, such as a sequence number.

Video encoder 28 may further encode data representing updates to one or more of the neural networks. The updates may include a purpose or type for the neural network to be updated, an identifier for the neural network (e.g., an updated sequence number corresponding to the current update), a change to the structures of the neural network, a change to one or more of the weights of the neural network, a change to one or more of the bias values of the neural network, a new value for a configuration parameter, or a change to the configuration parameters (e.g., an additional configuration parameter or removal of a configuration parameter). The configuration parameters may include, for example, a quantization parameter, a spatial downsampling ratio, and/or a temporal downsampling ratio.

Video encoder 28 may signal the data representing the neural networks and/or updates to the neural networks in high layer syntax (HLS) video data, such as in a sequence parameter set (SPS), a picture parameter set (PPS), or an adaptation parameter set (APS), or in a supplemental enhancement layer (SEI) message. Additionally or alternatively, output interface 32 may be configured to specify the data representing the neural networks and/or updates to the neural networks in network data external to the HLS data and the video data itself. That is, the HLS data and video data may be considered application layer data in the OSI network model, and output interface 32 may specify the data representing the neural networks and/or the updates to the neural networks in a program data unit of an application protocol or transport protocol, e.g., a Real-time Transport Protocol (RTP) packet, in a payload of the RTP packet that is separate from the video data itself, in an HTTP packet, or the like. Alternatively, output interface 32 may specify the data representing the neural networks and/or the updates to the neural networks in an RTP extension header of an RTP packet including corresponding video data.

Encapsulation unit 30 receives PES packets for elementary streams of a media presentation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Server device 60 includes transmitting unit 70 and network interface 72. In some example, the transmitting unit 70 may be based on Real-time Transport Protocol (RTP) and UDP. In some example, the transmitting unit 70 may be based on HTTP and TCP. In some example, the transmitting unit 70 may be based on HTTP, QUIC, and UDP. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of media content 64 and include components that conform substantially to those of server device 60. In general, network interface 72 is configured to send and receive data via network 74.

Transmitting unit 70 is configured to deliver media data to client device 40 via network 74 according to a network communication protocol, such as Real-time Transport Protocol (RTP), which is standardized in Request for Comment (RFC) 3550 by the Internet Engineering Task Force (IETF). Transmitting unit 70 may also implement protocols related to RTP, such as RTP Control Protocol (RTCP), Real-time Streaming Protocol (RTSP), Session Initiation Protocol (SIP), and/or Session Description Protocol (SDP). Transmitting unit 70 may send media data via network interface 72, which may implement Uniform Datagram Protocol (UDP) and/or Internet protocol (IP). Thus, in some examples, server device 60 may send media data via RTP and RTSP over UDP using network 74.

Transmitting unit 70 may receive an RTSP describe request from, e.g., client device 40. The RTSP describe request may include data indicating what types of data are supported by client device 40. Transmitting unit 70 may respond to client device 40 with data indicating media streams, such as media content 64, that can be sent to client device 40, along with a corresponding network location identifier, such as a uniform resource locator (URL) or uniform resource name (URN).

Transmitting unit 70 may then receive an RTSP setup request from client device 40. The RTSP setup request may generally indicate how a media stream is to be transported. The RTSP setup request may contain the network location identifier for the requested media data (e.g., media content 64) and a transport specifier, such as local ports for receiving RTP data and control data (e.g., RTCP data) on client device 40. Transmitting unit 70 may reply to the RTSP setup request with a confirmation and data representing ports of server device 60 by which the RTP data and control data will be sent. Transmitting unit 70 may then receive an RTSP play request, to cause the media stream to be "played," i.e., sent to client device 40 via network 74. Transmitting unit 70 may also receive an RTSP teardown request to end the streaming session, in response to which, transmitting unit 70 may stop sending media data to client device 40 for the corresponding session.

Receiving unit 52, likewise, may initiate a media stream by initially sending an RTSP describe request to server device 60. The RTSP describe request may indicate types of data supported by client device 40. Receiving unit 52 may then receive a reply from server device 60 specifying available media streams, such as media content 64, that can be sent to client device 40, along with a corresponding network location identifier, such as a uniform resource locator (URL) or uniform resource name (URN).

Receiving unit 52 may then generate an RTSP setup request and send the RTSP setup request to server device 60. As noted above, the RTSP setup request may contain the network location identifier for the requested media data (e.g., media content 64) and a transport specifier, such as local ports for receiving RTP data and control data (e.g., RTCP data) on client device 40. In response, receiving unit 52 may receive a confirmation from server device 60, including ports of server device 60 that server device 60 will use to send media data and control data.

After establishing a media session between server device 60 and client device 40, transmitting unit 70 of server device 60 may send media data (e.g., packets of media data) to client device 40 according to the media session. Server device 60 and client device 40 may exchange control data (e.g., RTCP data) indicating, for example, reception statistics by client device 40, such that server device 60 can perform congestion control or otherwise diagnose and address transmission faults.

Network interface 54 may receive and provide media of a selected media presentation to receiving unit 52, which may in turn provide the media data to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

According to the techniques of this disclosure, video decoder 48 may be configured to apply one or more video decoding neural networks to video data. In particular, video decoder 48 may receive data defining the neural networks in, e.g., the video bitstream or external to the video bitstream. For each neural network, video decoder 48 may receive data representing a purpose or type for the neural network, one or more structures for the neural network, weight values for the neural network, bias values for the neural network, and/or an identifier (e.g., a sequence number) for the neural network.

Initially, video decoder 48 may receive a set of encoded video data, along with data indicating which of the neural networks to apply to the encoded video data or to which portion of the video data. For example, the data specifying the neural networks may indicate a sequential arrangement of the neural networks that process the video data in order.

According to the techniques of this disclosure, video decoder 48 may also receive updates to one or more of the neural networks. Such updates may indicate whether to use an alternative neural network for a particular task, to skip processing by a neural network for a particular task, to drop one or more inner droppable structures from a neural network, or other changes to the neural network, e.g., changes to bias values, weight values, configuration parameters, or the like. Thus, video decoder 48 may apply the updates to the corresponding neural network(s), then decode the video data using the appropriately updated neural network(s). In some examples, video decoder 48 may retain copies of previous versions of the neural networks associated with corresponding sequence numbers, such that a previous version of the neural network can be reused, as identified by a corresponding sequence number.

In some examples, video decoder 48 may receive data representing the neural networks and/or the updates to the neural networks from the video bitstream itself. In some examples, video decoder 48 may receive either or both of the data representing the neural networks and/or the updates to the neural networks from, e.g., receiving unit 52, network interface 54, or other external means. For example, receiving unit 52 may be configured to determine whether an RTP packet includes data representing neural networks and/or updates to the neural networks in, e.g., an RTP packet payload or an RTP packet extension header. In the case the RTP packet payload includes the data representing the neural networks and/or updates to the neural networks, receiving unit 52 may determine whether a given RTP packet includes such neural network data by first checking a header of the RTP packet, which may indicate whether the payload includes such neural network data.

In this manner, video decoder 48 may be dynamically reconfigured to apply different sets of neural networks and/or to reconfigure the neural networks, according to the techniques of this disclosure.

Video encoder 28, video decoder 48, audio encoder 26, audio decoder 46, encapsulation unit 30, receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via receiving unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder

48 decodes encoded video data and sends the decoded video data, which may include a plurality of views of a stream, to video output 44.

Figure 2:
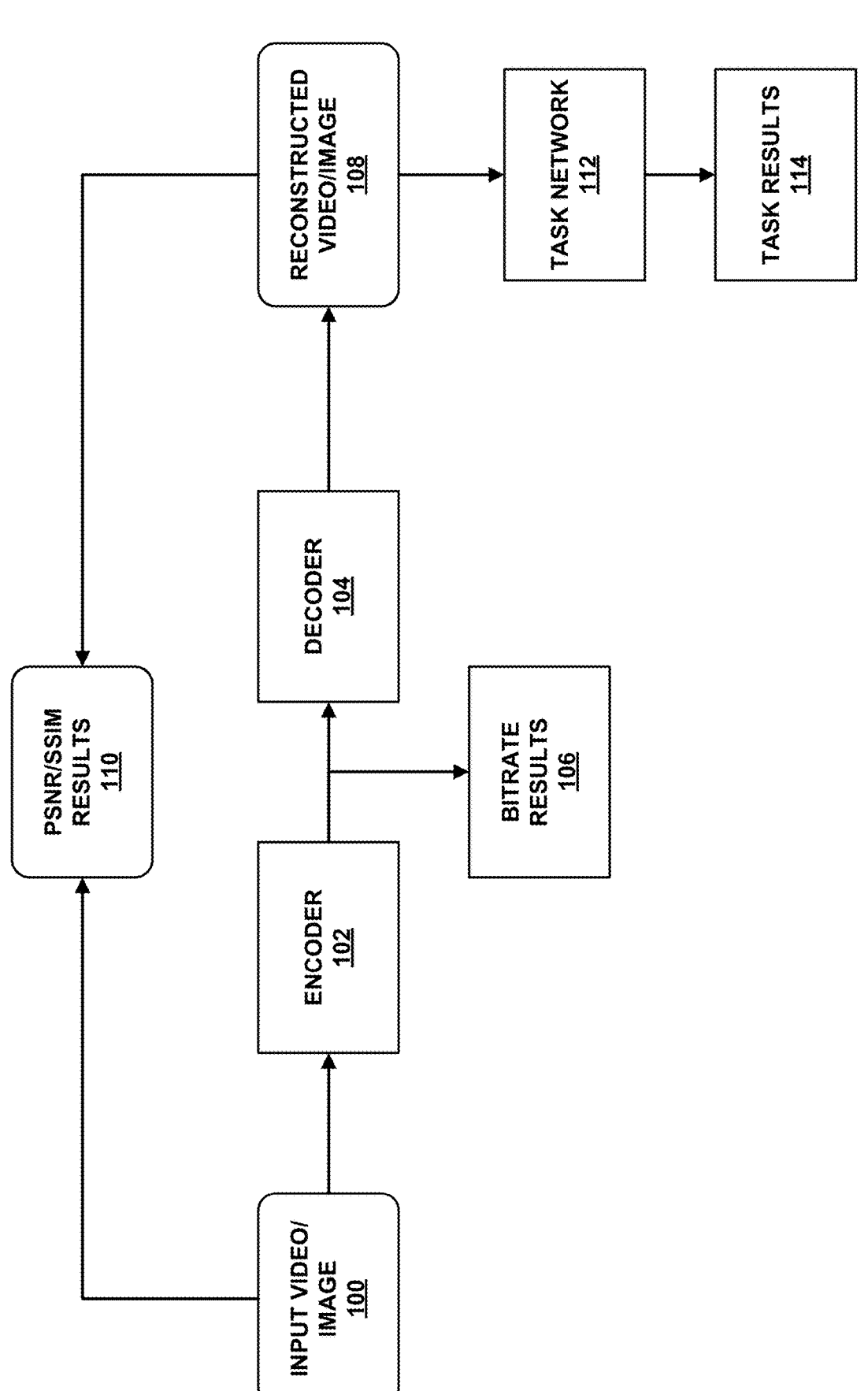
FIG. 2 is a conceptual diagram illustrating an example system that may perform the techniques of this disclosure.

FIG. 2 is a conceptual diagram illustrating an example system that may perform the techniques of this disclosure. In this example, FIG. 2 depicts a system including encoder 102, bitrate results 106, decoder 104, task network 112, and task results 114. In general, encoder 102 receives input video/image data 100, which may represent a single image, a sequence of images, video data, or the like. Encoder 102 encode the received data according to a defined set of neural network-based encoding tasks. Encoder 102 may test a variety of different neural networks and/or neural network configurations to determine which neural network/configuration results in best performance (e.g., according to rate-distortion metrics). PSNR/SSIM results 110 and bitrate results 106 may include metrics that encoder 102 may use to determine a best neural network and/or neural network configuration data for a particular set of media data to be encoded.

Per the techniques of this disclosure, encoder 102 may signal data representing the neural network(s) and/or configuration data in a media bitstream, in packet headers of packets of the media bitstream, or the like for reception by decoder 104. Initially, encoder 102 may signal the neural network(s) directly, whereas later in a media communication session, encoder 102 may signal updates to a previously signaled neural network.

Encoder 102 may test various modifications to the neural networks, such as modifying a quantization parameter. Neural networks may include around one million weight and bias values, and encoder 102 may modify such values and encode data representing such modifications. In general, the updated values may be small. Therefore, differential signaling may reduce the bitrate associated with signaling the updated neural networks.

In general, encoder 102 may signal to decoder 104 a first data structure that indicates an update to a second data structure. The second data structure may carry a neural network configuration associated with a compressed video (or image) bitstream. The compressed video bitstream may be for a machine learning task, e.g., video coding for machines (VCM), including object detection, object tracking, instance segmentation, and the like.

The second data structure may include any or all of the following information: a type or purpose of the neural network, data defining a neural network structure, weights and biases of the neural network, and/or an identifier, such as a sequence number. The type or purpose of the neural network may be, for example, whether the neural network performs region of interest (ROI) based coding, neural network based intra frame coding, frame-level spatial resampling, temporal resampling, or post filtering. The neural network structure may be expressed in a standardized format, such as Open Neural Network Exchange (ONNX) or Neural Network Exchange Format (NNEF). The type or purpose of a neural network may uniquely identify the neural network. In some examples, the data representing the neural network structure may signal the structure (e.g., ONNX or NNEF data) directly. In some examples, the data representing the neural network structure may signal a network location from which to retrieve the neural network structure, e.g., a uniform resource locator (URL), a uniform resource identifier (URI), or a uniform resource name (URN). Sequence numbers may be used to identify each data structure/neural network of the same type in ascending order.

The first data structure, which as noted above may indicate updates to the neural network (second data structure), may include data representing the type or purpose of the second data structure/neural network, the sequence number of the second data structure, the change to the structure of the second neural network (which may be in a compressed format), the change to the weights and/or biases of the neural network (which may be in a compressed format), and/or a new value or change in other configuration parameter, e.g., a quantization parameter, spatial downsampling ratio, or temporal downsampling ratio.

Encoder 102 may send data representing the initial neural network(s) as high level syntax (HLS) data in the image or video bitstream. The HLS data may include, for example, a video parameter set (VPS), a sequence parameter set (SPS), a picture parameter set (PPS), an adaptation parameter set (APS), or a supplemental enhancement information (SEI) message. Encoder 102 may determine which message type to use based on a frequency of changes to the neural networks. For example, VPS may be used if the neural network is not expected to change during the session. SPS may be used if the neural network is expected to change between scenes or otherwise remain applicable to a sequence of frames. PSP may be used to signal frequent changes, e.g., changes applicable to a particular picture.

Alternatively, as noted above, the data representative of the neural networks and/or changes to the neural networks may be signaled out-of-band, e.g., via transmission control protocol (TCP), e.g., as a file transfer, or via Real-time Transport Protocol (RTP) or Uniform Datagram Protocol (UDP), or via HTTP over QUIC and UDP, or via RTP over QUIC and UDP. In some examples, the two data structures may be carried in an RTP packet payload, and a payload type specified in the RPT packet header may indicate VCM metadata. In some examples, the two data structures may be carried in an RTP packet header extension included in an RTP packet that also carries data of the bitstream encoded by encoder 102. In still other examples, the data structures may be signaled via a data channel from encoder 102 to decoder 104, where the data channel may run on stream control transmission protocol (SCTP) of Web Real Time Communication (WebRTC) or IP Multimedia Subsystem (IMS) communications.

Decoder 104 may subsequently receive the data for the neural network(s) and updates to the neural network(s). Decoder 104 may apply the updates to the neural network(s), then use the updated neural networks to decode received media data. This results in reconstructed video/image 108. Task network 112 may perform a one or more of a variety of neural network-based processing tasks to reconstructed video/image 108, e.g., for object recognition, autonomous driving/robotic control, or other machine-based tasks. Task results 114 represent the results of such task processing.

Figure 3:
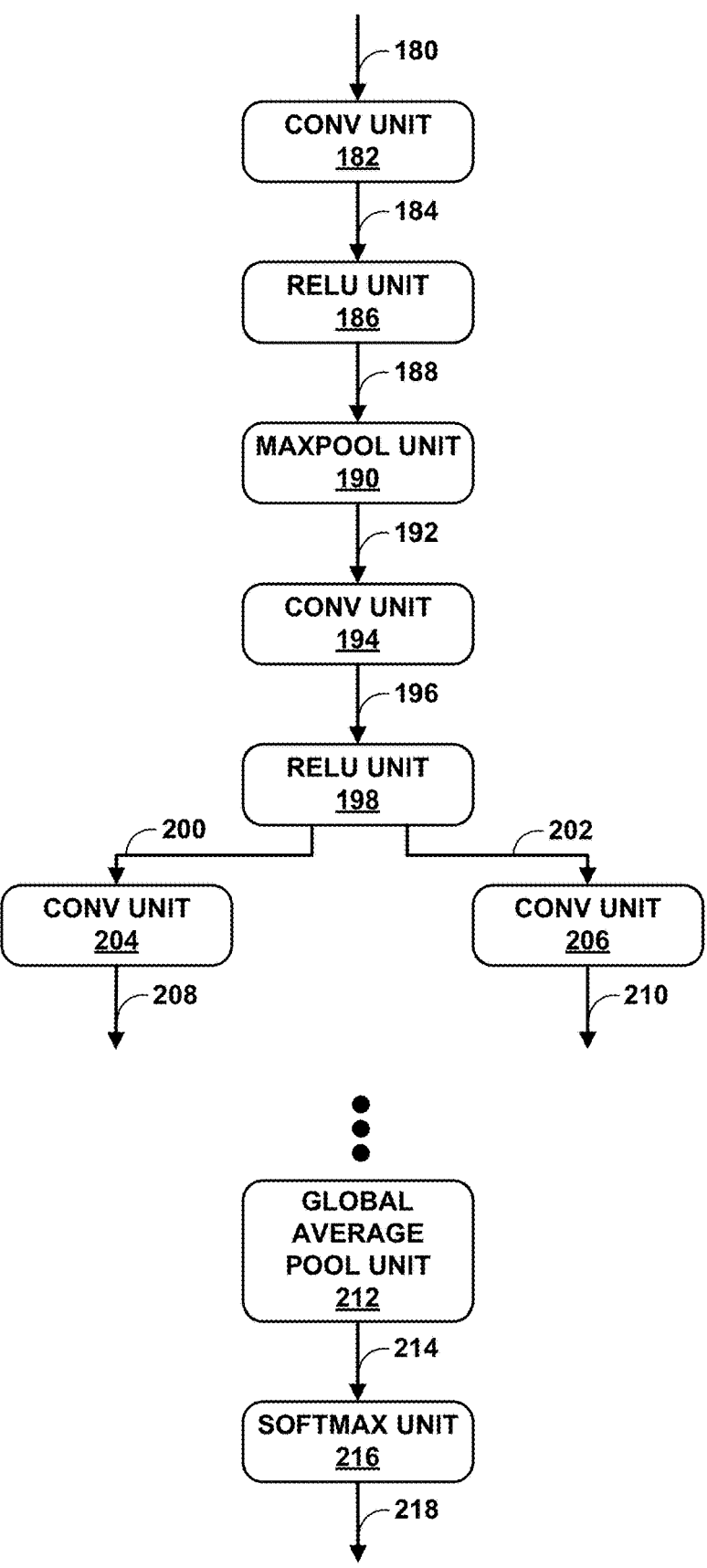
FIG. 3 is a graph illustrating an example computing graph according to techniques of this disclosure.

FIG. 3 is a graph illustrating an example computing graph according to techniques of this disclosure. In some examples, the techniques of this disclosure include identification of structures that may be modified, as discussed above. The example of FIG. 3 depicts structures including convolution (conv) unit 182, ReLU unit 184, MaxPool unit 190, convolution unit 194, ReLU unit 198, convolution unit 204, convolution unit 206, global average pool unit 212, and softmax unit 216.

In this example, convolution unit 182 receives data_0 180. Convolution unit 182 may have a W of <64×3×3×3> and a B of <64>. Convolution unit 182 may output conv1_1 184, and ReLU unit 186 may process conv1_1 184 to form conv1_2 188. MaxPool unit 190 may process conv1_2 188 to form pool1_1 192. Convolution unit 194 may have a W of <16×64×1×1> and a B of <16>. Convolution unit 194 may process pool1_1 192 to form fire2/squeeze1×1_1 196.

ReLU unit 198 may process fire2/squeeze1×1_1 196 to form either or both of fire2/squeeze1×1_2 200 and/or fire2/squeeze1×1_2 202. Convolution unit 204 may have a W of <64×16×1×1> and a B of <64> and may process fire2/squeeze1×1_2 200 to form fire2/expand1×1_1 208. Convolution unit 206 may have a W of <64×16×3×3> and a B of <64> and may process fire2/squeeze1×1_2 202 to form fire2/expand3×3_1 210. Additional units not shown in FIG. 5 may form part of the task network. Ultimately, global average pool unit 212 may receive the processed data and form pool10_1 214. Softmax unit 216 may process pool10_1 214 to form softmaxout_1 218.

A task network repository may include data representing various identifiers of structures of a computing graph, such as that shown in FIG. 3. The computing graph may be, for example, MLP, CNN, LSTM, GRU, transformer, or the like. The task network repository may send this data to the entity involved in performing the task network, e.g., a user equipment (UE). The UE may perform functionality described with respect to task network 112 of FIG. 2, for example.

The task network repository may also send the computing graph description tool or an indication of the computing graph description tool. Examples of computing graph description tools include Open Neural Network Exchange (ONNX) and Neural Network Exchange Format (NNEF). In some examples, the task network repository may alternatively send a URI, URL, or URN that defines and labels structural modifications, parameter configuration changes, or the like.

Figure 4:
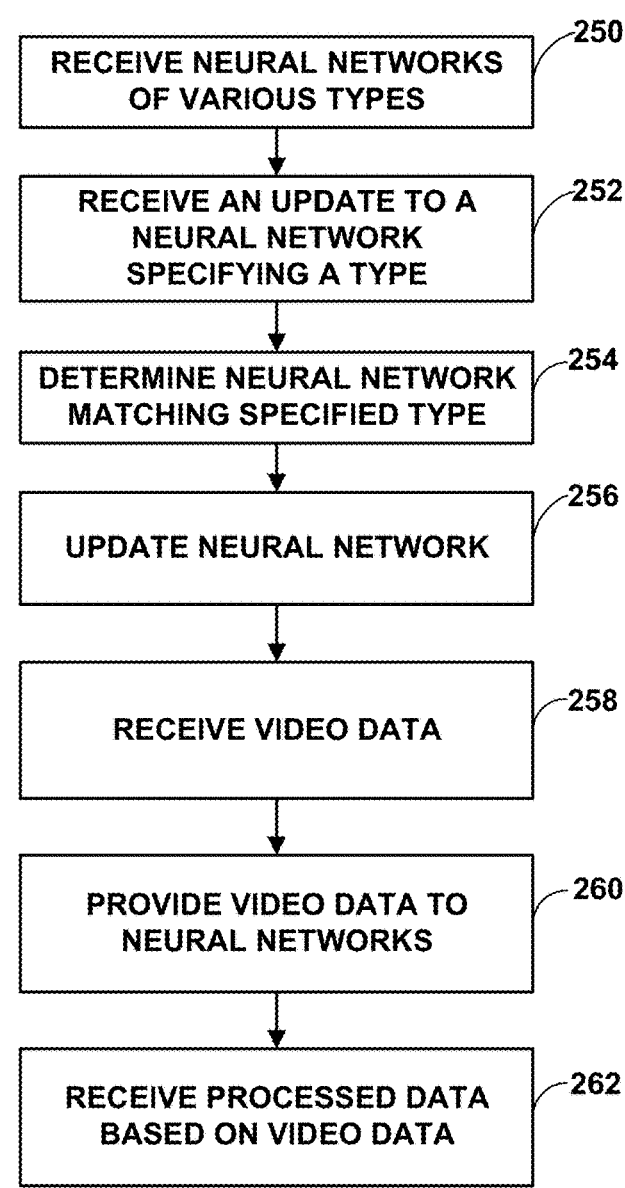
FIG. 4 is a flowchart illustrating an example method of updating a neural network according to techniques of this disclosure.

FIG. 4 is a flowchart illustrating an example method of updating a neural network according to techniques of this disclosure. The method of FIG. 4 may be performed by a network device, such as a cloud-based server, that receives video data and sends the video data to a neural network for processing, e.g., to perform video coding for machines (VCM). For example, video decoder 48 of FIG. 1 or decoder 104 of FIG. 2 may be configured to perform the method of FIG. 4. For purposes of explanation, the method of FIG. 4 is explained with respect to decoder 104 of FIG. 2.

Initially, decoder 104 receives data representing a plurality of neural networks of various types (250). That is, each of the neural networks may have an associated type. The type for a neural network may represent processing tasks performed by that neural network. Such processing tasks may include, for example, region of interest (ROI) based coding, intra-prediction coding, frame-level spatial resampling, temporal resampling, post filtering, or other such processing tasks. The plurality of neural networks may be associated with a particular video bitstream.

Decoder 104 may receive encoded video data of the video bitstream and provide the encoded video data to the plurality of neural networks to cause the plurality of neural networks decode the video bitstream. Additionally or alternatively, decoded video data may be sent to some or all of the neural networks to perform various VCM tasks, such as object recognition, object detection, object tracking, instance segmentation, or the like.

At some point, per techniques of this disclosure, one or more of the neural networks may need to be updated. The update may apply for only a specified period of time, or the update may apply continuously (unless the neural network(s) are later updated again). Thus, decoder 104 may receive an update to one of the neural networks, and the update may specify a type for a neural network to which the update applies (252). In some examples, the update may specify an identifier for a version of the neural network, such as a sequence number.

The update may be included in high level syntax (HLS) of the video data. For example, the update may be included in a supplemental enhancement information (SEI) message or a parameter set, such as sequence parameter set (SPS) or a picture parameter set (PPS). Additionally or alternatively, neural network updates may be specified in a packet header, such as an RTP or RTSP header extension. For example, the header may indicate that the RTP/RTSP packet payload includes neural network update data, or the neural network update data may be included in the header itself. As another example, the update data may indicate a location from which to retrieve data to be used to update the neural network, e.g., a URL, URI, or URN for data to be used to update the neural network. As still another example, decoder 104 may initiate a connection (e.g., IMS or WebRTC) via a data channel specified in the update data to retrieve the neural network update data.

While only one update is represented in FIG. 4, the update data may include updates for one or more of the plurality of neural networks. The update may represent updates to, for example, the structure of the neural network, weights within the neural network, biases to be applied, parameter values, or the like. In general, the data representing the update may indicate a difference (or delta) relative to the exiting neural network, rather than fully specifying a new, replacement neural network.

Decoder 104 may determine the neural network of the plurality of neural networks matching the type specified in the update (254). Decoder 104 may then update the determined neural network (256). Thus, after receiving new video data (258), decoder 104 may provide the video data to the neural networks (260), including the updated neural network(s), and receive processed (e.g., decoded and/or object detection data) data based on the video data (262).

In this manner, the method of FIG. 4 represents an example of a method including receiving data representing a plurality of neural networks associated with a video bitstream, each of the plurality of neural networks having a different type; receiving data representing an update to at least one of the neural networks, the data including a type corresponding to the at least one of the neural networks and a neural network structure for the update; updating the neural network according to the data representing the update to generate an updated neural network; and providing video data from the video bitstream to the updated neural network to cause the updated neural network to process the video data.

Various examples of the techniques of this disclosure are summarized in the following clauses:

Clause 1: A method of processing video data, the method comprising: receiving data representing a neural network associated with a video bitstream; receiving data representing an update to the neural network; updating the neural network according to the data representing the update to generate an updated neural network; and providing video data from the video bitstream to the updated neural network to cause the updated neural network to process the video data.

Clause 2: The method of clause 1, wherein the video bitstream comprises an encoded video bitstream, the method further comprising decoding the video bitstream to form decoded video data, wherein providing the video data to the updated neural network comprises providing the decoded video data to the updated neural network.

Clause 3: The method of any of clauses 1 and 2, wherein the data representing the neural network includes one or more of a type or purpose of the neural network, a structure for the neural network, weight values for the neural network, bias values for the neural network, or an identifier for the neural network.

Clause 4: The method of clause 3, wherein the data representing the neural network includes the type or purpose of the neural network, the type or purpose comprising at least one of region of interest (ROI) based coding, neural network based intra-prediction coding, frame-level spatial resampling, temporal resampling, or post filtering.

Clause 5: The method of any of clauses 3 and 4, wherein data representing the neural network includes the structure for the neural network expressed in one of Open Neural Network Exchange (ONNX) format, Neural Network Exchange Format (NNEF), or a format defined at a universal resource locator (URL), universal resource identifier (URI), or universal resource name (URN).

Clause 6: The method of any of clauses 3-5, wherein the data representing the neural network includes the identifier, and wherein the identifier comprises a sequence number.

Clause 7: The method of any of clauses 1-6, wherein the data representing the update includes one or more of a type for the neural network, an identifier for the neural network, a change to a structure of the neural network, a change to weights of the neural network, a change to biases of the neural network, a new value for a configuration parameter, or a change to the configuration parameter.

Clause 8: The method of clause 7, wherein the configuration parameter comprises one of a quantization parameter, a spatial downsampling ratio, or a temporal downsampling ratio.

Clause 9: The method of any of clauses 1-8, wherein receiving the data representing the update comprises receiving the data representing the update in at least one of a video parameter set (VPS), a sequence parameter set (SPS), a picture parameter set (PPS), or in a supplemental enhancement information (SEI) message.

Clause 10: The method of any of clauses 1-8, wherein receiving the data representing the update comprises receiving the data representing the update via Transmission Control Protocol (TCP), Real-time Transport Protocol (RTP), or Uniform Datagram Protocol (UDP).

Clause 11: The method of clause 10, wherein receiving the data representing the update comprises receiving the data representing update in a payload of an RTP packet, further comprising extracting data from a header of the RTP packet indicating that the payload includes the data representing the update.

Clause 12: The method of clause 10, wherein receiving the data representing the update comprises receiving the data representing update in an RTP packet header extension.

Clause 13: The method of any of clauses 1-8, wherein receiving the data representing the update comprises receiving the data representing the update in a data channel of one of an IP Multimedia Subsystem (IMS) or Web Real-Time Communications (WebRTC).

Clause 14: A device for processing video data, the device comprising one or more means for performing the method of any of clauses 1-13.

Clause 15: The device of clause 14, wherein the one or more means comprise a processing system comprising one or more processors implemented in circuitry.

Clause 16: The device of any of clauses 14 and 15, further comprising a memory configured to store the video data.

Clause 17: The device of any of clauses 14-16, further comprising a display configured to display the decoded video data.

Clause 18: The device of any of clauses 14-17, wherein the device comprises one or more of a camera, a computer, a mobile device, a broadcast receiver device, or a set-top box.

Clause 19: A device for processing video data, the device comprising: means for receiving data representing a neural network associated with a video bitstream; means for receiving data representing an update to the neural network; means for updating the neural network according to the data representing the update to generate an updated neural network; and means for providing video data from the video bitstream to the updated neural network to cause the updated neural network to process the video data.

Clause 20: A method of processing video data, the method comprising: receiving data representing a plurality of neural networks associated with a video bitstream, each of the plurality of neural networks having a different type; receiving data representing an update to at least one of the neural networks, the data including a type corresponding to the at least one of the neural networks and a neural network structure for the update; updating the neural network according to the data representing the update to generate an updated neural network; and providing video data from the video bitstream to the updated neural network to cause the updated neural network to process the video data.

Clause 21: The method of clause 20, wherein the type represents a task to which the data representing the update corresponds, and wherein each of the neural networks is configured to perform a respective task.

Clause 22: The method of clause 21, further comprising determining the at least one of the neural networks that performs the task indicated in the data representing the update.

Clause 23: The method of clause 21, wherein the plurality of neural networks are configured to perform at least one of region of interest (ROI) based coding, neural network based intra-prediction coding, frame-level spatial resampling, temporal resampling, or post filtering.

Clause 24: The method of clause 20, wherein the video bitstream comprises an encoded video bitstream, the method further comprising decoding the video bitstream to form decoded video data, wherein providing the video data to the updated neural network comprises providing the decoded video data to the updated neural network.

Clause 25: The method of clause 20, wherein the video bitstream comprises an encoded video bitstream, and wherein providing the video data to the updated neural network comprises providing the encoded video data to the updated neural network.

Clause 26: The method of clause 20, wherein the data representing the neural network includes one or more weight values for the neural network, bias values for the neural network, or an identifier for the neural network.

Clause 27: The method of clause 26, wherein the data representing the neural network includes the identifier, and wherein the identifier comprises a sequence number.

Clause 28: The method of clause 20, wherein the data representing the plurality of neural network includes structures for the plurality of neural networks expressed in one of Open Neural Network Exchange (ONNX) format, Neural Network Exchange Format (NNEF), or a format defined at a universal resource locator (URL), universal resource identifier (URI), or universal resource name (URN).

Clause 29: The method of clause 20, wherein the data representing the update includes one or more of an identifier for the at least one of the neural networks, a change to a structure of the at least one of the neural networks, a change to weights of the at least one of the neural networks, a change to biases of the at least one of the neural networks, a new value for a configuration parameter, or a change to the configuration parameter.

Clause 30: The method of clause 29, wherein the configuration parameter comprises one of a quantization parameter, a spatial downsampling ratio, or a temporal downsampling ratio.

Clause 31: The method of clause 20, wherein receiving the data representing the update comprises receiving the data representing the update in at least one of a video parameter set (VPS), a sequence parameter set (SPS), a picture parameter set (PPS), or in a supplemental enhancement information (SEI) message.

Clause 32: The method of clause 20, wherein receiving the data representing the update comprises receiving the data representing the update via Transmission Control Protocol (TCP), Real-time Transport Protocol (RTP), or User Datagram Protocol (UDP).

Clause 33: The method of clause 32, further comprising performing a session initiation for TCP, RTP, or UDP.

Clause 34: The method of clause 32, wherein receiving the data representing the update comprises receiving the data representing update in a payload of an RTP packet, further comprising extracting data from a header of the RTP packet indicating that the payload includes the data representing the update.

Clause 35: The method of clause 32, wherein receiving the data representing the update comprises receiving the data representing update in an RTP packet header extension.

Clause 36: The method of any of clauses 1-30, wherein receiving the data representing the update comprises receiving the data representing the update in a data channel of one of an IP Multimedia Subsystem (IMS) or Web Real-Time Communications (WebRTC).

Clause 37: A device for processing video data, the device comprising: a memory configured to store video data; and a processing system implemented in circuitry, the processing system being configured to: receive data representing a plurality of neural networks associated with a video bitstream, each of the plurality of neural networks having a different type; receive data representing an update to at least one of the neural networks, the data including a type corresponding to the at least one of the neural networks and a neural network structure for the update; update the neural network according to the data representing the update to generate an updated neural network; and provide video data from the video bitstream to the updated neural network to cause the updated neural network to process the video data.

Clause 38: The device of clause 37, wherein the type represents a task to which the data representing the update corresponds, and wherein each of the neural networks is configured to perform a respective task, wherein the processing system is further configured to determine the at least one of the neural networks that performs the task indicated in the data representing the update.

Clause 39: A device for processing video data, the device comprising: means for receiving data representing a plurality of neural networks associated with a video bitstream, each of the plurality of neural networks having a different type; means for receiving data representing an update to at least one of the neural networks, the data including a type corresponding to the at least one of the neural networks and a neural network structure for the update; means for updating the neural network according to the data representing the update to generate an updated neural network; and means for providing video data from the video bitstream to the updated neural network to cause the updated neural network to process the video data.

Clause 40: A method of processing video data, the method comprising: receiving data representing a plurality of neural networks associated with a video bitstream, each of the plurality of neural networks having a different type; receiving data representing an update to at least one of the neural networks, the data including a type corresponding to the at least one of the neural networks and a neural network structure for the update; updating the neural network according to the data representing the update to generate an updated neural network; and providing video data from the video bitstream to the updated neural network to cause the updated neural network to process the video data.

Clause 41: The method of clause 40, wherein the type represents a task to which the data representing the update corresponds, and wherein each of the neural networks is configured to perform a respective task.

Clause 42: The method of clause 41, further comprising determining the at least one of the neural networks that performs the task indicated in the data representing the update.

Clause 43: The method of any of clauses 41 and 42, wherein the plurality of neural networks are configured to perform at least one of region of interest (ROI) based coding, neural network based intra-prediction coding, frame-level spatial resampling, temporal resampling, or post filtering.

Clause 44: The method of any of clauses 40-43, wherein the video bitstream comprises an encoded video bitstream, the method further comprising decoding the video bitstream to form decoded video data, wherein providing the video data to the updated neural network comprises providing the decoded video data to the updated neural network.

Clause 45: The method of any of clauses 40-43, wherein the video bitstream comprises an encoded video bitstream, and wherein providing the video data to the updated neural network comprises providing the encoded video data to the updated neural network.

Clause 46: The method of any of clauses 40-45, wherein the data representing the neural network includes one or more weight values for the neural network, bias values for the neural network, or an identifier for the neural network.

Clause 47: The method of clause 46, wherein the data representing the neural network includes the identifier, and wherein the identifier comprises a sequence number.

Clause 48: The method of any of clauses 40-47, wherein the data representing the plurality of neural network includes structures for the plurality of neural networks expressed in one of Open Neural Network Exchange (ONNX) format, Neural Network Exchange Format (NNEF), or a format defined at a universal resource locator (URL), universal resource identifier (URI), or universal resource name (URN).

Clause 49: The method of any of clauses 40-48, wherein the data representing the update includes one or more of an identifier for the at least one of the neural networks, a change to a structure of the at least one of the neural networks, a change to weights of the at least one of the neural networks, a change to biases of the at least one of the neural networks, a new value for a configuration parameter, or a change to the configuration parameter.

Clause 50: The method of clause 49, wherein the configuration parameter comprises one of a quantization parameter, a spatial downsampling ratio, or a temporal downsampling ratio.

Clause 51: The method of any of clauses 40-50, wherein receiving the data representing the update comprises receiving the data representing the update in at least one of a video parameter set (VPS), a sequence parameter set (SPS), a picture parameter set (PPS), or in a supplemental enhancement information (SEI) message.

Clause 52: The method of any of clauses 40-52, wherein receiving the data representing the update comprises receiving the data representing the update via Transmission Control Protocol (TCP), Real-time Transport Protocol (RTP), or User Datagram Protocol (UDP).

Clause 53: The method of clause 52, further comprising performing a session initiation for TCP, RTP, or UDP.

Clause 54: The method of any of clause 52 and 53, wherein receiving the data representing the update comprises receiving the data representing update in a payload of an RTP packet, further comprising extracting data from a header of the RTP packet indicating that the payload includes the data representing the update.

Clause 55: The method of any of clauses 52-54, wherein receiving the data representing the update comprises receiving the data representing update in an RTP packet header extension.

Clause 56: The method of any of clauses 40-55, wherein receiving the data representing the update comprises receiving the data representing the update in a data channel of one of an IP Multimedia Subsystem (IMS) or Web Real-Time Communications (WebRTC).

Clause 57: A device comprising one or more means for performing the method of any of clauses 40-56.

Clause 58: A computer-readable storage medium having stored thereon instructions that, when executed, cause a processor to perform the method of any of clauses 40-56.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:

receiving data representing a plurality of neural networks associated with a video bitstream, each of the plurality of neural networks having a different type;

receiving data representing an update to at least one of the neural networks, the data including a type corresponding to the at least one of the neural networks and a neural network structure for the update, the neural network structure for the update including one or more inner droppable structures to be removed from the at least one of the neural networks;

updating the at least one of the neural networks according to the data representing the update to remove the one or more inner droppable structures to generate an updated neural network; and providing video data from the video bitstream to the plurality of neural networks including the updated neural network to cause the plurality of neural networks including the updated neural network to process the video data.

2. The method of claim 1, wherein the type represents a task to which the data representing the update corresponds, and wherein each of the neural networks is configured to perform a respective task.

3. The method of claim 2, further comprising determining the at least one of the neural networks that performs the task indicated in the data representing the update.

4. The method of claim 2, wherein the plurality of neural networks are configured to perform at least one of region of interest (ROI) based coding, neural network based intra-prediction coding, frame-level spatial resampling, temporal resampling, or post filtering.

5. The method of claim 1, wherein the video bitstream comprises an encoded video bitstream, the method further comprising decoding the video bitstream to form decoded video data, wherein providing the video data to the updated neural network comprises providing the decoded video data to the updated neural network.

6. The method of claim 1, wherein the video bitstream comprises an encoded video bitstream, and wherein providing the video data to the updated neural network comprises providing the encoded video bitstream to the updated neural network.

7. The method of claim 1, wherein the data representing the neural network includes one or more weight values for the neural network, bias values for the neural network, or an identifier for the neural network.

8. The method of claim 7, wherein the data representing the neural network includes the identifier, and wherein the identifier comprises a sequence number.

9. The method of claim 1, wherein the data representing the plurality of neural networks include the structures for the plurality of neural networks expressed in one of Open Neural Network Exchange (ONNX) format, Neural Network Exchange Format (NNEF), or a format defined at a universal resource locator (URL), universal resource identifier (URI), or universal resource name (URN).

10. The method of claim 1, wherein the data representing the update includes one or more of an identifier for the at least one of the neural networks, a change to a structure of the at least one of the neural networks, a change to weights of the at least one of the neural networks, a change to biases of the at least one of the neural networks, a new value for a configuration parameter, or a change to the configuration parameter.

11. The method of claim 10, wherein the configuration parameter comprises one of a quantization parameter, a spatial downsampling ratio, or a temporal downsampling ratio.

12. The method of claim 1, wherein receiving the data representing the update comprises receiving the data representing the update in at least one of a video parameter set (VPS), a sequence parameter set (SPS), a picture parameter set (PPS), or in a supplemental enhancement information (SEI) message.

13. The method of claim 1, wherein receiving the data representing the update comprises receiving the data representing the update via Transmission Control Protocol (TCP), Real-time Transport Protocol (RTP), or User Datagram Protocol (UDP).

14. The method of claim 13, further comprising performing a session initiation for TCP, RTP, or UDP.

15. The method of claim 13, wherein receiving the data representing the update comprises receiving the data representing update in a payload of an RTP packet, further comprising extracting data from a header of the RTP packet indicating that the payload includes the data representing the update.

16. The method of claim 13, wherein receiving the data representing the update comprises receiving the data representing update in an RTP packet header extension.

17. The method of claim 1, wherein receiving the data representing the update comprises receiving the data representing the update in a data channel of one of an IP Multimedia Subsystem (IMS) or Web Real-Time Communications (WebRTC).

18. A device for processing video data, the device comprising:

a memory configured to store video data; and a processing system implemented in circuitry, the processing system being configured to:

receive data representing a plurality of neural networks associated with a video bitstream, each of the plurality of neural networks having a different type;

receive data representing an update to at least one of the neural networks, the data including a type corresponding to the at least one of the neural networks and a neural network structure for the update, the neural network structure for the update including one or more inner droppable structures to be removed from the at least one of the neural networks;

update the at least one of the neural networks according to the data representing the update to remove the one or more inner droppable structures to generate an updated neural network; and provide video data from the video bitstream to the plurality of neural networks including the updated neural network to cause the plurality of neural networks including the updated neural network to process the video data.

19. The device of claim 18, wherein the type represents a task to which the data representing the update corresponds, and wherein each of the neural networks is configured to perform a respective task, wherein the processing system is further configured to determine the at least one of the neural networks that performs the task indicated in the data representing the update.

20. A device for processing video data, the device comprising:

means for receiving data representing a plurality of neural networks associated with a video bitstream, each of the plurality of neural networks having a different type;

means for receiving data representing an update to at least one of the neural networks, the data including a type corresponding to the at least one of the neural networks and a neural network structure for the update, the neural network structure for the update including one or more inner droppable structures to be removed from the at least one of the neural networks;

means for updating the at least one of the neural networks according to the data representing the update to remove the one or more inner droppable structures to generate an updated neural network; and means for providing video data from the video bitstream to the plurality of neural networks including the updated neural network to cause the plurality of neural networks including the updated neural network to process the video data.

* * * * *